(12) United States Patent
Mikkelsen et al.

(10) Patent No.: US 7,649,149 B2
(45) Date of Patent: Jan. 19, 2010

(54) METHOD AND DEVICE FOR MAINTENANCE OF HIGH-VOLTAGE SWITCHGEAR WITH VOLTAGE

(75) Inventors: Per Steinar Mikkelsen, Steinkjer (NO); Geir Solum, Trondheim (NO)

(73) Assignee: Trondheim Energiverk Nett AS, Trondheim (NO)

( * ) Notice: Subject to any disclaimer, the term of this patent is extended or adjusted under 35 U.S.C. 154(b) by 0 days.

(21) Appl. No.: 12/297,228

(22) PCT Filed: May 4, 2007

(86) PCT No.: PCT/NO2007/000157
§ 371 (c)(1), (2), (4) Date: Dec. 17, 2008

(87) PCT Pub. No.: WO2007/129905
PCT Pub. Date: Nov. 15, 2007

(65) Prior Publication Data
US 2009/0095610 A1    Apr. 16, 2009

(30) Foreign Application Priority Data
May 5, 2006   (NO) ................... 20062006

(51) Int. Cl.
*H01H 31/02* (2006.01)
(52) U.S. Cl. .................. 200/48 R; 200/50.08
(58) Field of Classification Search ............. 200/48 R, 200/50.08; 361/605
See application file for complete search history.

(56) References Cited

U.S. PATENT DOCUMENTS

| | | | | |
|---|---|---|---|---|
| 3,614,350 A * | 10/1971 | Eichelberger et al. | .... 200/50.21 |
| 3,896,353 A * | 7/1975 | Burton et al. | ............... 361/609 |
| 4,351,990 A * | 9/1982 | Hesselbart et al. | ........ 200/50.22 |
| 4,386,246 A * | 5/1983 | Castonguay | ............. 200/50.22 |
| 4,424,425 A * | 1/1984 | Castonguay | ............. 200/50.22 |
| 4,443,676 A * | 4/1984 | Castonguay | ................ 200/304 |
| 4,447,682 A * | 5/1984 | Castonguay | ............. 200/50.22 |
| 4,689,716 A * | 8/1987 | Cooper et al. | ............... 361/837 |
| 4,713,501 A * | 12/1987 | Herrmann | ................ 200/50.22 |
| 4,773,870 A * | 9/1988 | Sinnig | ........................ 439/136 |
| 4,791,530 A * | 12/1988 | Kalvaitis et al. | ............ 361/600 |
| 4,864,466 A * | 9/1989 | Gasparetto | ................... 361/605 |
| 5,181,158 A * | 1/1993 | Goe et al. | .................... 361/605 |
| 5,181,164 A * | 1/1993 | Beard et al. | ................. 361/617 |
| 5,194,840 A * | 3/1993 | Frutuoso et al. | ............. 335/202 |
| 5,327,321 A * | 7/1994 | Rosen | ......................... 361/617 |
| 5,483,416 A * | 1/1996 | Goe, Jr. | ...................... 361/600 |
| 5,497,287 A * | 3/1996 | Yee et al. | .................... 361/617 |
| 5,910,757 A * | 6/1999 | Broghammer et al. | ......... 335/9 |
| 6,031,191 A * | 2/2000 | Ahlert et al. | ............. 200/50.21 |
| 6,919,518 B2 * | 7/2005 | Rademacher et al. | ....... 200/1 R |
| 7,067,747 B2 * | 6/2006 | Deylitz et al. | ............ 200/50.21 |
| 7,310,221 B2 * | 12/2007 | Lammers | ..................... 361/632 |
| 2009/0095610 A1 * | 4/2009 | Mikkelsen et al. | ........ 200/48 R |

* cited by examiner

*Primary Examiner*—Ross N Gushi
(74) *Attorney, Agent, or Firm*—Dennison, Schultz & MacDonald

(57) ABSTRACT

Method for maintenance of high-voltage switchgear/fuses in an installation, which method is performed while the switchgear/installation is under operation/voltage. It is further provided a device for carrying out the method, which device includes screening plates 20A-C, which screening plates are provided with maneuvring means 22 and 25, fastening means 23 and 24 for fastening of the screening plates to the switchgear cell/installation and means for disconnecting the switch 27, 28A-B.

9 Claims, 5 Drawing Sheets

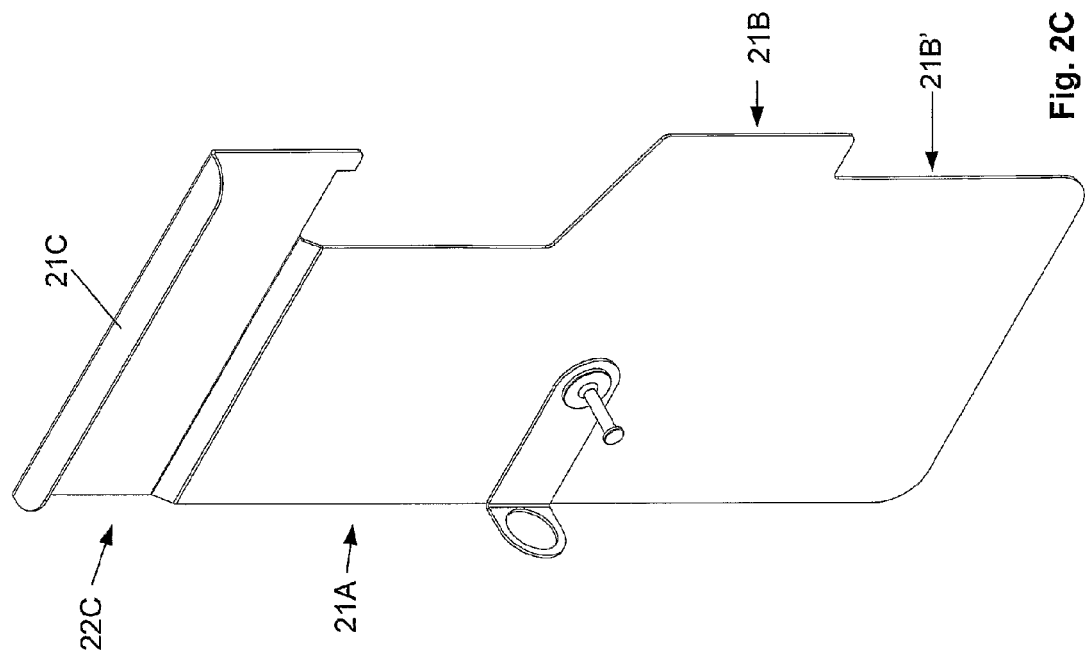
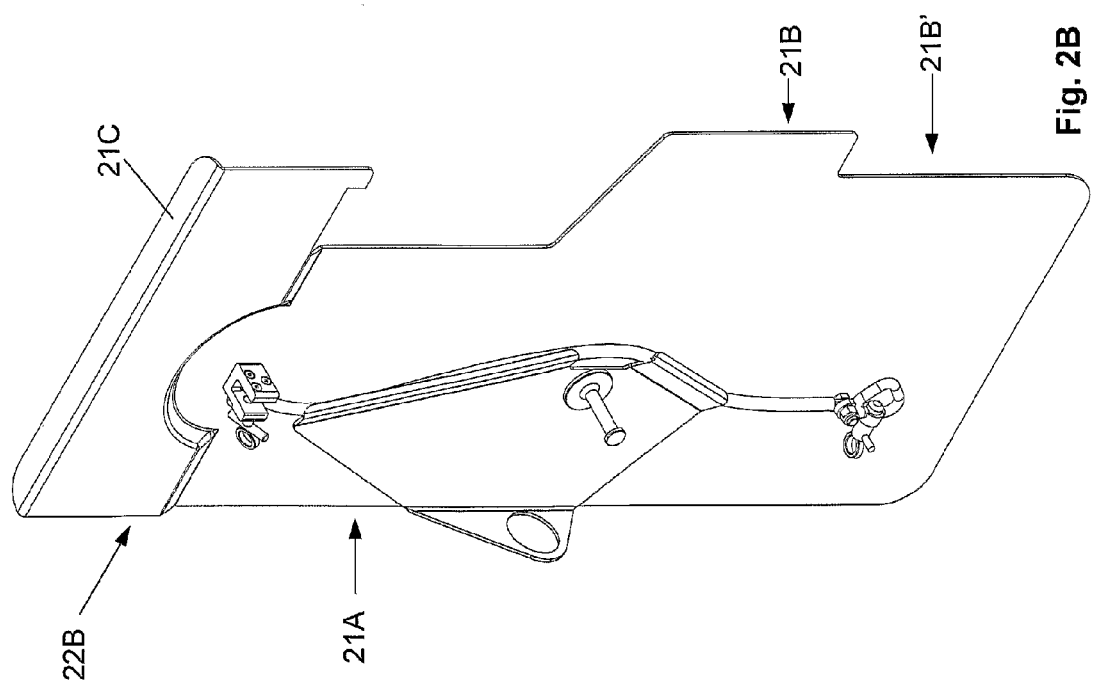

METHOD AND DEVICE FOR MAINTENANCE OF HIGH-VOLTAGE SWITCHGEAR WITH VOLTAGE

The invention relates to a device for maintenance of high-voltage switchgear, preferably diverter switch and disconnecting switch. The invention also relates to a method for performing safely maintenance of high-voltage switch gear with voltage.

BACKGROUND

Electrical network/installations include high-voltage switchgears, as an example in network stations, i.e. distributing stations which, usually by step-down transformation, supplies distribution nets with low voltage or which opposite transforms the voltage up. High-voltage is usually supplied to these network stations, which accordingly is transformed down to the correct voltage which is distributed out to the users, i.e. households and companies. All such installations include equipment which needs maintenance. Examples of such equipment are diverter switch and disconnecting switch which are used to connect/disconnect the different distribution loops that a transformer is connected to. Today, different solutions for cleaning such installations exist, e.g. with respect to dust etc. in a network station.

It is related great danger for personnel working in connection with such installations. It is thus related stringent demands to work in connection with high-voltage installations, and these demands are, among other factors, governed by "Regulations of safety during work in and operation of high-voltage installations, Section 33" in the "Law for supervision of electrical installations and electrical equipment, with instructions and guidance", which regards for Norway.

In relation to work under voltage it is required that you use, among other things, insulated tools and some examples of such tools are shown in DE10356887, which describes a tool set of equipment for work under voltage.

Today, however no solutions exists which are related to maintenance of high-voltage switchgears in an installation, while the switchgear/installation is under operation, i.e. under voltage. This is something that is wanted; since maintenance of this kind requires that the parts of the installation are disconnected, as for example a network station, before maintenance is performed. This is something that causes unnecessary costs for power companies, since the adjacent parts of the installation (network stations) must be reconnected to supply the network loop which is connected to the current part of the installation, which is to be maintained with voltage. This results in increased labour costs and in some cases, also loss of incomes if the current distribution loop not can be supplied with energy via other parts of the installation (network stations).

OBJECT

The object of the invention is to provide a method and device which solves the problems described above. It is a further object of the invention to provide a method for secure maintenance of high-voltage switchgears in an installation, both regarded to personnel and equipment. It is a further object of the invention to provide a method that can be performed during operation of the switchgear/installation, so that it can be operative during maintenance work. It is a further object to provide a device for secure performance of the method.

It is a further object that the invention meets the requirements of "Regulations of safety during work in and operation of high-voltage installations, Section 33" in the "Law for supervision of electrical installations and electrical equipment, with instructions and guidance", which regards for Norway, and similar laws in other countries.

SUMMARY OF THE INVENTION

Safety and functionality is the main focus of the invention.

The most actual area of use of the invention is network stations, and network stations will be used in the following description, but it should be understood that the invention also can be used in other areas which includes high-voltage switchgears.

During work under voltage in an installation, preferably a network station, it is important to ensure the safety of personnel which works with the installation. It is thus provided a device which makes maintenance of switchgears possible, preferably diverter switch and disconnecting switch, while the switchgears/installation are/is under full operation. The device includes specially formed screening plates to shield/insulate switchgears/phases from each other, and from the walls of the switchgear cell.

The screening plates, which preferably are of PVC, or some other suitable material, preferably have a design which is accommodated for fastening to switchgear brackets or some other fastening points which are arranged in connection with phases/switchgears. The screening plates are provided with means, preferably a lifting eye and a finger bracket, which makes a simple and secure arrangement of the screening plates between the phases/switchgears/cell walls possible, preferably by means of an insulated claw rod.

The screening plates are further provided with fastening means for fastening of a shunt, which is used to connect a bypass over the switchgears. The shunt is provided with terminal clamps at its respective ends, which are adapted to the connection points of the phases. The connection of shunt to the connection points to the phases can be done by means of suitable insulated tools, such as an insulated claw rod. The connections of the shunt are further provided with means which securely fastens the connections of the shunt to the connection points of the phase.

It is further provided a method for maintenance of high-voltage switchgears which is performed by means of the device according to the invention. The method preferably includes the steps:

1. performing of important checkpoints before carrying out the maintenance
2. marking of safety distance
3. removing containment boom
4. arrangement of screening plates according to the invention
5. connection of shunts to the connection points of the phases to connect a bypass over the switchgears
6. measuring and control of the current load of the shunts
7. disconnecting/laying out the switchgears
8. maintenance and function test of switch
9. disconnection of shunts from the connection points
10. removing screening plates
11. replacing the containment boom This method secures full operation of the switchgear/installation during maintenance and the safety of personnel and equipments is ensured.

BRIEF DESCRIPTION OF THE DRAWINGS

The invention will now be more detailed described with reference to the Figures, where:

FIG. 2A-C is a view of screening plates according to the invention.

DESCRIPTION OF THE PREFERRED EMBODIMENTS

Figure 1:
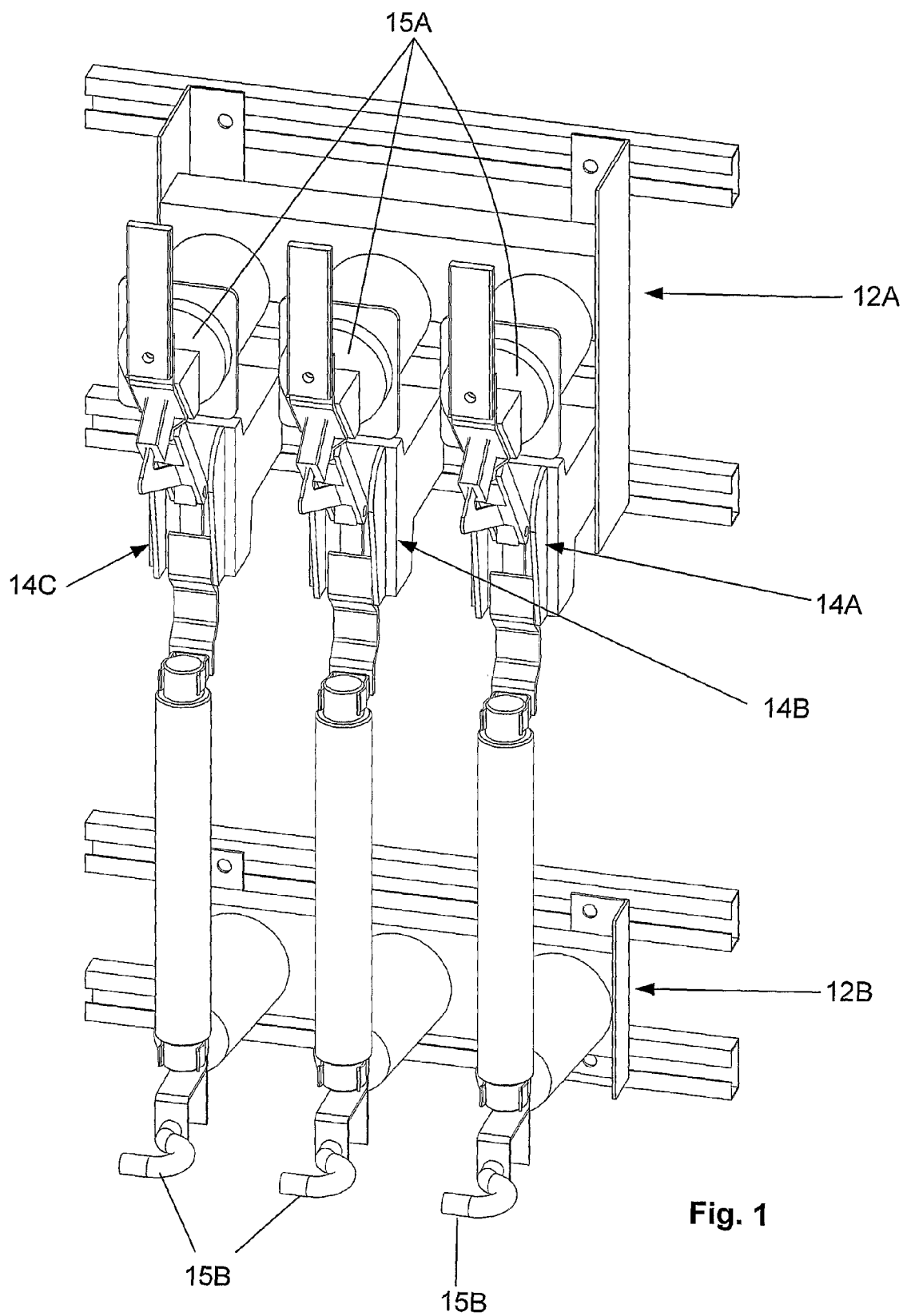
FIG. 1 is a schematic overview of an example of a switchgear cell with phases/switchgears/fuses.

FIG. 1 shows a standard connection in a switchgear cell. A standard connection includes two switchgear brackets 12A and 12B, which are hangers and support for the screening plates. The connection further includes three phases 13A-C with each own fuse/switchgear 14A-C. Each phase 13A-C has upper 15A and lower 15B connection points, respectively, where the upper connection point 15A is a rail, while the lower 15B connection point is shaped as a projecting hook. This arrangement is the basis for maintenance, where maintenance needs to be performed in relation to switchgears/fuses 14A-14C.

As the arrangement is today, maintenance can not be performed while the switchgear/installation is under voltage/operation, something that will be possible by means of the invention.

Figure 2A:
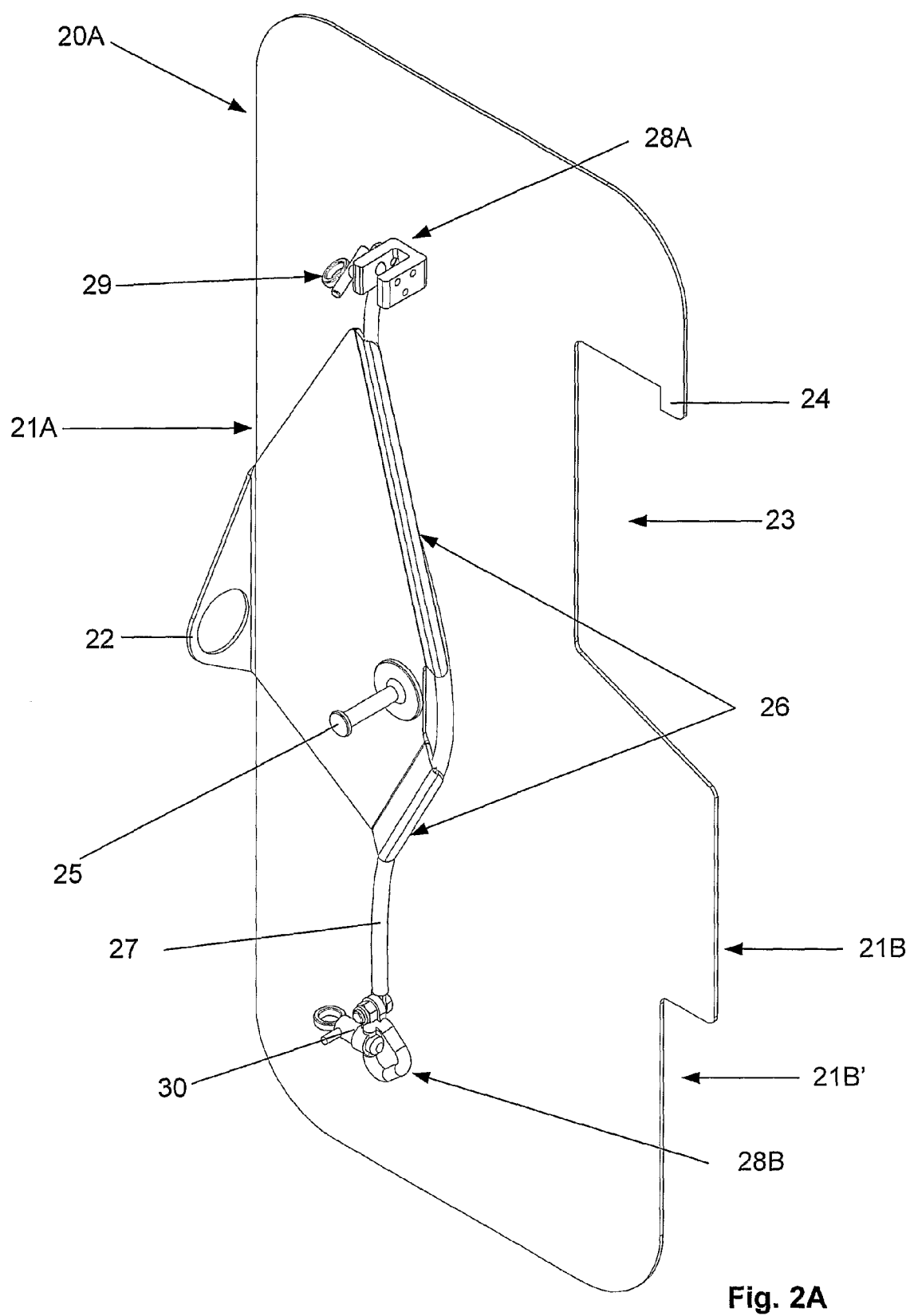

Referring now to FIGS. 2A-C, which shows different screening plates 20A-C, according to the invention, which are designed for use during maintenance when the network station is under voltage/operation. The screening plates 20A-C are designed to be fixed to the switchgear bracket 12A in the switchgear cell.

The screening plates 20A are preferably of PVC and have preferably a principally rectangular shape, which rounded at the corners. On one of the longitudinal sides 21A it is arranged a lift eye 22, preferably of PVC, which projects perpendicular out from the screening plate 20A. On the other longitudinal side 21B, the plate includes a recess 23 which extends both in the longitudinal and vertical direction of the screening plate 20A. The recess 23 is principally rectangular, with the longitudinal sides parallel to the longitudinal sides of the screening plates 20A. The recess 23 has at its upper vertical side, a projecting tip 24 which extends along the longitudinal side 21B and in the same plane as the screening plate 20A. The lower vertical side inclines slightly down from the inner longitudinal side of the recess 23 and out against the longitudinal side 21B. The recess 23 is shaped so due to that the screening plate 20A can be fixed to the switch bracket 12A. The longitudinal side 21B further includes in the lower part, an area 21B' which results in that the screening plates 20A has a smaller width in this area, to adapt the screening plate 20A to the lower switch gear bracket 12B.

The screening plate 20A further includes a finger bracket 25, preferably of PVC, for a claw rod, which is arranged perpendicular to the screening plate and project perpendicular out from the screening plate 20A. The lift eye 22 and the finger bracket 25 are arranged at adapted locations, so that by manoeuvring of the screening plate 20A-C by means of for example a claw rod, moving of the screening plate 20A-C in a mainly vertical position can be obtained, which is advantageous at the insertion of the screening plate 20A-C at the performance of maintenance, which is further described below under the description of the method.

The screening plate 20A further includes means 26, such as canals or similar, which extends mainly in the longitudinal direction of the screening plates 20A, which means 26 are fixed to the screening plate 20A. The purpose of the means 26 is to firmly hold a shunt 27. The shunt 27 is arranged to the means 26 which preferably are arranged in a position that provides the terminal clamps 28A and 28B to be positioned close to the connection points 15A and 15B, at the same time as the shunt does not lie in the way of the claw rod during insertion of the screening plates 20A in the network station, further described below under the description of the method. The shunt has a length that makes connection to the connection points 15A and 15B possible, but is advantageously some longer than this to make a flexible connection possible.

The shunt 27 has at its ends connections 28A and 28B in the form of terminal clamps. The terminal clamp 28A is adapted to the connection point 15A, and is preferably a U-shaped aluminium clamp, wherein, in one of the U-sides is arranged a clamping bolt 29 in a threaded hole for secure fastening of the aluminium clamp to the connection point 15A.

The terminal clamp 28B is adapted to the connection point 15B is preferably triangle shaped (or ring shaped) with a clamping bolt 30 arranged on one side of the triangle.

The screening plates 20B has the same shape as the screening plate 20A, but is at its upper part inclined some inwards, before the screening plate 20B continues in a parallel plane some distance before the screening plate ends out in a part 21C, which is angled 90° in relation to the plane, in a direction opposite to the side where the shunt 27 is arranged.

The purpose of the inclining is adaptation to the remaining shape of the installation (network station) and the purpose of the angled part 21C is safety, especially to prevent the claw rod from coming in contact with electric leading parts above the switch gear during maintenance. The screening plate 20B, incidentally includes the same elements as screening plate 20A and is thus not further described.

The screening plate 20C has the same shape as the screening plate 20B, but is at its upper part inclined some outwards, before the screening plate 20C continues in a parallel plane, and the part 21C that the screening plate ends out in, is angled in the opposite way as for the screening plate 20B. The screening plate 20C incidentally includes a lift eye and a finer bracket in the same way as the screening plate 20B and is thus not further described. The screening plate 20C includes not the shunt and fastening means for it.

The different screening plates 20A-C are designed in different sizes which are adapted to the different switchgears/installations which they are used on, for example installation/switchgear for 12 kV and 22 kV, which will have different sizes of the switchgears/fuses and for installations with only switchgears, without fuses. The screening plates must thus be designed different for different manufacturer, but after the same principle as the invention.

For example, if the design of the installation (network station) permits for it, the screening plates 20B and 20C do not need to include an area which is inclined some in relation to the main plane of the screening plates, but can have the same design as the screening plate 20A.

The screening plates 20A-C, the lift eye 22, the finger bracket 25 are preferably made of PVC or some other suitable material which has the desired properties as regards weight, durability and electrical insulation properties. The fastening means 26 for the shunt 27 is preferably made of PVC. Other suitable materials for the individual elements can also be used.

A method according to the invention for work under voltage in a switchgear cell will now be described. The basis for the method is a switchgear cell which for example is described in FIG. 1.

Equipment that is needed for the method is:
Screening plates according to the invention
A claw rod
AUS tool rod
Various equipment for trimming and greasing
Protective equipment:
  Flameproof clothing
  Helmet with face shield
  Work gloves Except from the screening plates, which are described above, the rest of the equipment is known and approved as regards norm and tested for this purpose.

Before start, the following important checkpoints are performed:
Control that the screening plates are adapted to the switchgear of the installation
The screening plates and other insulated tools must be clean and dry, and visually controlled to discover possible defects
By careful use of a insulated rod, control the fuses and connections
Control that the switchgear that is to be maintained is in activated position before screening plates with shunt are arranged.

The performance of the method will now be described.

The first step of the method is to mark the safety distance, i.e. the distance from the voltage conducting part. The distance depends on the voltage level and shall be stated in the work procedure.

The next step includes removing a containment boom, which is standard safety in all switchgear cells.

Figure 3:
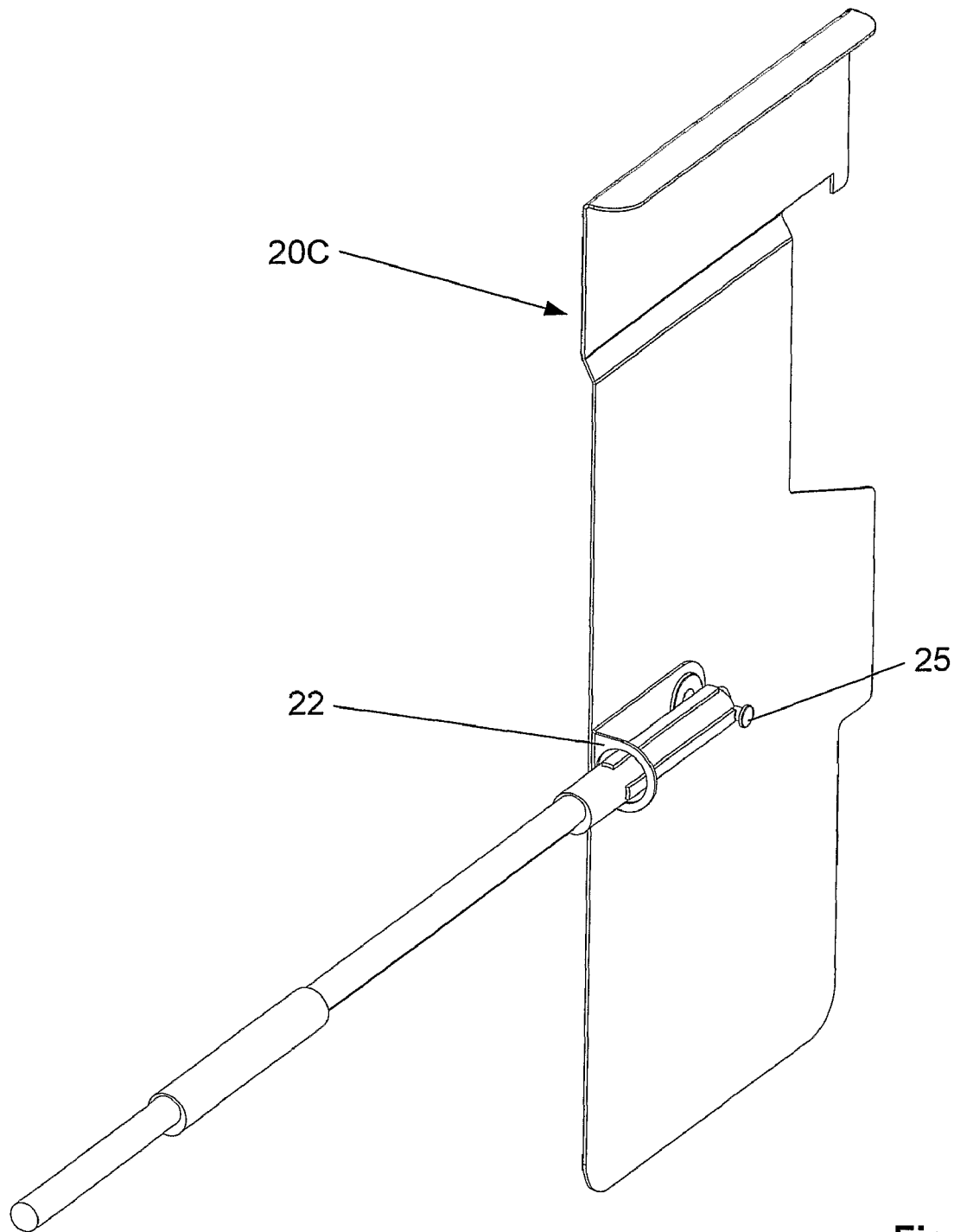
FIG. 3 shows the use of a claw rod in manoeuvring of screening plates as shown in FIGS. 2A-C.
Figure 4:
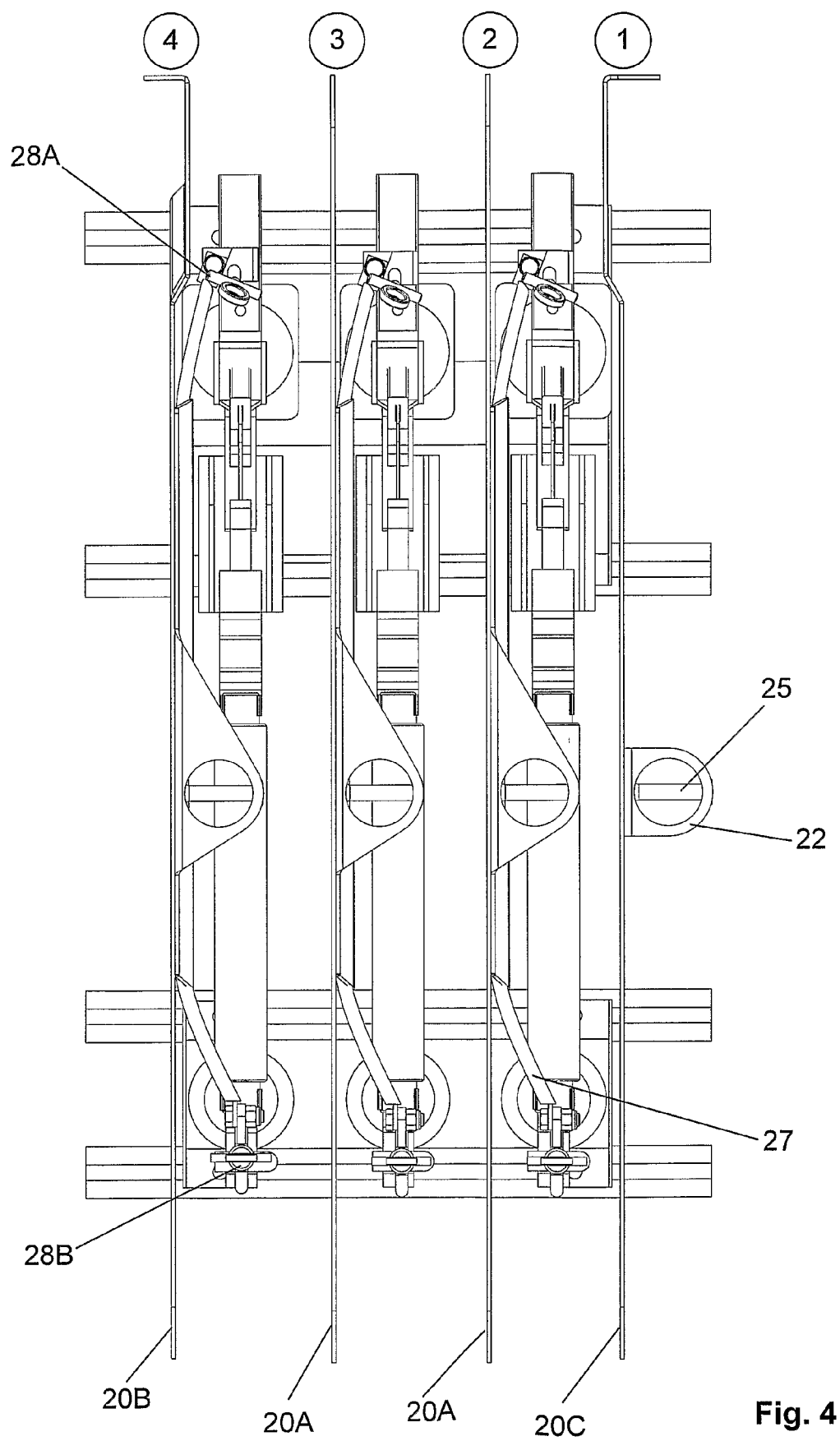
FIG. 4 shows the switchgear cell in FIG. 1, after the arrangement of the device according to the invention.

The next step includes insertion and arrangement of screening plates. The screening plates are inserted by using an insulated claw rod, as shown in FIG. 3, which is guided through the lift eye 22 and in contact with the finger bracket 25. This makes it possible to manoeuvre the screening plates in a mainly vertical position and secure in place between the cell wall and the first phase/switchgear, between the first phase/switchgear and the second phase/switchgear, respectively, etc. The arrangement of screening plates is made from right to left, as shown in FIG. 4. First, the screening plate 20C is arranged, following two screening plates 20A and in the end a screening plate 20B. With this sequence shielding of cell wall and conducting parts in other phases is obtained, while the screening plates 20A-B with shunts 27 are arranged. The screening plates 20A-C is, as mentioned, inserted by means of a claw rod and hanged on the upper switchgear bracket 12A by means of the recess 23 and held in place by means of the projecting tip 24.

The next step includes connection of the shunts 27 on the screening plates 20A-B to the connection points 15A-B and disconnection of the switchgear. It is here important to measure the current load and control that the measured value lies within the allowable load for the shunt 27. The measurements are appropriate inserted in a table.

If necessary, paint and the like are trimmed of the connection points. After this the connection of the shuts 27 can be performed. The shunts 27 are preferably first connected with the upper terminal clamp 28A to the connection point 15A and fixed thereto by tightening the claming bolt 29. Next the lower terminal clamp 28B is connected and fixed by tightening the clamping bolt 30. It is in addition important to check that the shunt 27 does not come in conflict with the switchgear knives when these are to be moved. The connection and fastening of the terminal clamps to the shunts 27 are for example carried out by using the claw rod or some other insulated tool which is suitable for this purpose.

The next step includes controlling the connection by measuring the current load in the shunt and switchgear/cable. The measurements are also here adequately inserted in a table. The connection is evaluated from the measuring result, and the result between the individual shunts 27.

The next step includes disconnecting the switchgear. The door should be closed during working with the switchgear, as this is standard procedure at the power company. If one or several knives hangs left when the switch is disconnected, these are removed by suitable tool (not further described).

The next step includes maintenance and function test. The necessary maintenance is performed, for example, trimming and lubrication of the switchgear contacts and lubrication of the spring system. To obtain a good function test, the switchgear should be activated ca. 3-4 times. The disconnection mechanism is also tested when the switchgear is in a disconnected position.

After the necessary maintenance and the function test are performed, the switchgear is connected and a control of the switchgears are connected is performed before the shunts are disconnected. Following, the screening plates 20A-C are removed and the containment boom is arranged back in place, and the network station is thus back to normal operation.

MODIFICATIONS

Other suitable materials can be used for the screening plates. The screening plates can in addition have other designs, for example they can be designed with other means for fastening the screening plates to other fastening points in the installation/switchgear cell, for example hooks which are arranged on the screening plates which fastens it to suitable fastening points in the installation/switchgear cell, such as spacers for phases/switchgears.

The screening plates can also be provided with hooks for fastening of the shunt before it is connected to the connection points.

What is claimed is:

1. Device for maintenance of high-voltage switchgear/fuses in an installation, characterized in that the device includes screening plates (20A-C), which preferably are of PVC and preferably have a mainly rectangular shape, and which screening plates (20A-C) are provided with
   means (22, 25) for insertion and arrangement of the screening plates (20A-C) in a switchgear cell,
   means (23, 24) for fastening of the screening plates (20A-C) to the switchgear cell/installation, and
   means (27;28A-B) for connection of a bypass over switchgear/fuses.

2. Device according to claim 1, characterized in that the means for fastening of the screening plates (20A-C) to the switchgear cell/installation includes that the screening plates (20A-C) are provided with a recess (23), which recess (23) is provided with a projecting tip (24), via which means (23, 24) the screening plates (20A-C) are securely fastened in the switchgears cell.

3. Device according to claim 1, characterized in that means for disconnection of the switchgear/fuse includes a shunt (27) with connections (28A and 28B).

4. Device according to claim 3, characterized in that the shunt (27) is fastened to the screening plates (20A-C) by means of suitable means (26), such as canals or similar, which are arranged on the screening plates (20A-B).

5. Device according to claim 1, characterized in that means for insertion and arrangement of the screening plates (20A-C) in a switchgear cell/installation includes a lift eye (22) and a finger bracket (25), arranged in suitable locations so that the screening plates (20A-C) can be manoeuvred in a mainly vertical position by means of a claw rod.

6. Device according to claim 1, characterized in that the screening plates (20B-C) includes an area in the upper part, which is some inclined inwards (20B) or outwards (20C) in relation to the main plane of the screening plates, before the screening plate continues in a parallel plane and ends out in a part (21C) angled preferably 90° inwards (20C) or outwards (20B) in relation to the parallel plane.

7. Device according to claim 1, characterized in that the screening plates (20B-C) in the lower part includes an area (21B') where the screening plates (20B-C) have a smaller width.

8. Method for safely maintenance of high-voltage switchgear/fuses in an installation, which method is performed while the switchgear/installation is under operation/voltage, by means of the device described in claim 1, comprising the steps of:
- performing of important checkpoints before carrying out the maintenance;
- marking of safety distance;
- removing containment boom;
- arrangement of screening plates according to the invention;
- connection of shunts to the connection points of the phases to connect a bypass over the switchgears/fuses;
- measuring and control of the current load of the shunts;
- disconnecting/laying out the switchgears;
- maintenance and function test of switchgear;
- disconnection of shunts from the connection points;
- removing screening plates; and
- replacing the containment boom.

9. Method according to claim 8, characterized in that the step with performing important checkpoints before carrying out the maintenance includes:
- controlling that the screening plates are adapted to the switchgear/fuse,
- controlling that the screening plates and other insulated tools are clean and dry, and visually control to discover possible defects,
- control of fuses and connections by careful use of a insulated rod, and
- controlling that the switchgear/fuse that is to be maintained is in activated position before screening plates are arranged.

* * * * *